US009053711B1

(12) United States Patent
Smith et al.

(10) Patent No.: US 9,053,711 B1
(45) Date of Patent: Jun. 9, 2015

(54) METHOD OF MATCHING A DIGITIZED STREAM OF AUDIO SIGNALS TO A KNOWN AUDIO RECORDING

(71) Applicant: Ampersand, Inc., Carlisle, MA (US)

(72) Inventors: Stephen Smith, Carlisle, MA (US); George Howitt, Toronto (CA)

(73) Assignee: Ampersand, Inc., Carlisle, MA (US)

( * ) Notice: Subject to any disclaimer, the term of this patent is extended or adjusted under 35 U.S.C. 154(b) by 13 days.

(21) Appl. No.: 14/023,424

(22) Filed: Sep. 10, 2013

(51) Int. Cl.
H04M 1/64 (2006.01)
G10L 25/78 (2013.01)
H04M 3/533 (2006.01)
H04M 3/493 (2006.01)

(52) U.S. Cl.
CPC ............... G10L 25/78 (2013.01); H04M 3/533 (2013.01); H04M 2201/40 (2013.01); H04M 3/493 (2013.01)

(58) Field of Classification Search
CPC ....... G10L 17/26; G10L 17/005; G10L 25/78; H04M 2201/41; H04M 2203/6027; H04M 3/385; H04M 2201/40; H04M 3/493
USPC .................. 379/114.14, 145, 88.01
See application file for complete search history.

(56) References Cited

U.S. PATENT DOCUMENTS

| 4,677,466 | A | 6/1987 | Lert et al. |
| 5,918,223 | A | 6/1999 | Blum et al. |
| 6,246,751 | B1 * | 6/2001 | Bergl et al. .................. 379/67.1 |
| 6,327,345 | B1 * | 12/2001 | Jordan ....................... 379/88.02 |
| 6,469,749 | B1 | 10/2002 | Dimitrova et al. |
| 6,480,825 | B1 * | 11/2002 | Sharma et al. ................. 704/270 |
| 6,990,453 | B2 * | 1/2006 | Wang et al. .................... 704/270 |
| 7,330,538 | B2 | 2/2008 | Dunsmuir |
| 7,346,512 | B2 | 3/2008 | Li-Chun Wang et al. |
| 7,359,889 | B2 | 4/2008 | Wang et al. |
| 7,366,461 | B1 | 4/2008 | Brown |
| 7,379,875 | B2 | 5/2008 | Burges et al. |
| 7,451,078 | B2 | 11/2008 | Bogdanov |
| 7,512,221 | B2 * | 3/2009 | Toms ....................... 379/114.14 |
| 7,627,477 | B2 | 12/2009 | Wang et al. |
| 7,739,062 | B2 | 6/2010 | Wang et al. |
| 7,853,664 | B1 | 12/2010 | Wang et al. |

(Continued)

OTHER PUBLICATIONS

Nguyen, M. et al.; "Efficient Advertisement Discovery for Audio Podcast Content Using Candidate Segmentation"; EURASIP Journal on Audio Speech, and Music Processing; Jun. 2010; all pages; vol. 2010; Hindawi Publishing Corporation.

Primary Examiner — Lisa Hashem
(74) Attorney, Agent, or Firm — North Shore Patents, P.C.; Michele Liu Baillie; Lesley Leonessa

(57) ABSTRACT

A system and method matches a digitized stream of audio signals to a known audio recording by receiving an audio stream from an application. The method performs signal analysis on sound and silence in the audio stream to compute a stream audio print of the audio stream, to identify a pattern associated with the audio stream. The method compares the stream audio print to one or more known audio prints from a library of known audio prints. The method first applies a silence constraint to match periods of silence. If application of the silence constraint is successful, the method computes a total scoring metric function to identify a match between the stream audio print and the known audio print. The total scoring metric function employs a scoring metric function that is computed at a subset of temporal points in the non-silent portion of the audio stream audio print.

20 Claims, 14 Drawing Sheets

(56) References Cited

U.S. PATENT DOCUMENTS

| | | | |
|---|---|---|---|
| 7,865,368 B2 | 1/2011 | Li-Chun Wang et al. | |
| 7,881,657 B2 | 2/2011 | Wang et al. | |
| 7,986,913 B2 | 7/2011 | Wang et al. | |
| 8,015,123 B2 | 9/2011 | Barton et al. | |
| 8,086,171 B2 | 12/2011 | Wang et al. | |
| 8,090,579 B2 | 1/2012 | Debusk et al. | |
| 8,109,435 B2 | 2/2012 | Mayo et al. | |
| 8,352,259 B2 | 1/2013 | Bogdanov | |
| 8,494,854 B2 * | 7/2013 | Gross | 704/246 |
| 2001/0008554 A1 * | 7/2001 | Finnigan | 379/88.02 |
| 2004/0006474 A1 * | 1/2004 | Gong et al. | 704/270.1 |
| 2004/0240631 A1 * | 12/2004 | Broman et al. | 379/88.02 |
| 2006/0248019 A1 | 11/2006 | Rajakumar | |
| 2008/0154609 A1 * | 6/2008 | Wasserblat et al. | 704/273 |
| 2008/0195387 A1 * | 8/2008 | Zigel et al. | 704/236 |
| 2009/0046841 A1 * | 2/2009 | Hodge | 379/189 |
| 2009/0310763 A1 * | 12/2009 | Chambers et al. | 379/114.14 |
| 2010/0040342 A1 | 2/2010 | Kemp et al. | |
| 2010/0179813 A1 * | 7/2010 | Summerfield et al. | 704/246 |
| 2011/0320202 A1 * | 12/2011 | Kaufman | 704/251 |
| 2012/0331386 A1 | 12/2012 | Hicken et al. | |
| 2013/0016815 A1 * | 1/2013 | Odinak et al. | 379/88.01 |
| 2013/0111514 A1 | 5/2013 | Slavin et al. | |
| 2014/0136194 A1 * | 5/2014 | Warford et al. | 704/233 |

* cited by examiner

204 IF APPLICATION OF THE SILENCE CONSTRAINT IS SUCCESSFUL, COMPUTE A TOTAL SCORING METRIC FUNCTION ASSOCIATED WITH THE POTENTIAL MATCH TO IDENTIFY A MATCH BETWEEN THE STREAM AUDIO PRINT AND THE KNOWN AUDIO PRINT

205 OVERLAY THE STREAM AUDIO PRINT WITH THE KNOWN AUDIO PRINT

206 COMPUTE A SCORING METRIC FUNCTION AT A SUBSET OF TEMPORAL POINTS

207 SUM A RESULT OF THE SCORING METRIC FUNCTION AT EACH OF THE SUBSET OF TEMPORAL POINTS TO CREATE A TOTAL SCORE METRIC, WHEREIN THE TOTAL SCORE METRIC IS A RESULT OF THE TOTAL SCORING METRIC FUNCTION

FIG. 4

```
┌─────────────────────────────────────────────────────────────────────────┐
│ 208 COMPUTE A SCORING METRIC FUNCTION AT A SUBSET OF TEMPORAL POINTS    │
│                                                                         │
│  ┌───────────────────────────────────────────────────────────────────┐  │
│  │ 209 COMPUTE THE SCORING METRIC FUNCTION, AT A TEMPORAL POINT,     │  │
│  │ BETWEEN COMPONENT DATA FROM THE STREAM AUDIO PRINT AND            │  │
│  │ COMPONENT DATA FROM THE KNOWN AUDIO PRINT, WHEREIN THE            │  │
│  │ COMPONENT DATA FROM THE STREAM AUDIO PRINT COMPRISES:             │  │
│  │   I)   A FIRST FREQUENCY ASSOCIATED WITH THE STREAM AUDIO PRINT   │  │
│  │   II)  A SECOND FREQUENCY ASSOCIATED WITH THE STREAM AUDIO PRINT  │  │
│  │   III) A FIRST AMPLITUDE RATIO ASSOCIATED WITH THE FIRST          │  │
│  │        FREQUENCY AND THE SECOND FREQUENCY                         │  │
│  │ WHEREIN THE COMPONENT DATA FROM THE KNOWN AUDIO PRINT COMPRISES:  │  │
│  │   I)   A THIRD FREQUENCY ASSOCIATED WITH THE KNOWN AUDIO PRINT    │  │
│  │   II)  A FOURTH FREQUENCY ASSOCIATED WITH THE KNOWN AUDIO PRINT   │  │
│  │   III) A SECOND AMPLITUDE RATIO ASSOCIATED WITH THE THIRD         │  │
│  │        FREQUENCY AND THE FOURTH FREQUENCY                         │  │
│  └───────────────────────────────────────────────────────────────────┘  │
│                                    │                                    │
│                                    ▼                                    │
│  ┌───────────────────────────────────────────────────────────────────┐  │
│  │ 210 CALCULATE A FIRST COMPONENT AS A DIFFERENCE BETWEEN THE       │  │
│  │ FIRST FREQUENCY AND THE THIRD FREQUENCY                           │  │
│  └───────────────────────────────────────────────────────────────────┘  │
│                                    │                                    │
│                                    ▼                                    │
│  ┌───────────────────────────────────────────────────────────────────┐  │
│  │ 211 APPLY A FIRST TUNABLE PARAMETER TO SCALE THE FIRST COMPONENT  │  │
│  └───────────────────────────────────────────────────────────────────┘  │
│                                    │                                    │
│                                    ▼                                    │
│  ┌───────────────────────────────────────────────────────────────────┐  │
│  │ 212 CALCULATE A SECOND COMPONENT AS A DIFFERENCE BETWEEN THE      │  │
│  │ SECOND FREQUENCY AND THE FOURTH FREQUENCY                         │  │
│  └───────────────────────────────────────────────────────────────────┘  │
└─────────────────────────────────────────────────────────────────────────┘
```

FIG. 5a

```
┌─────────────────────────────────────────────────────────────────────┐
│ 218 COMPUTE A SCORING METRIC FUNCTION AT A SUBSET OF TEMPORAL POINTS│
│                                                                     │
│   ┌─────────────────────────────────────────────────────────────┐   │
│   │ 219 CHOSE THE SUBSET OF TEMPORAL POINTS AS TEMPORAL POINTS  │   │
│   │ THAT ARE NOT PERIODS OF SILENCE                             │   │
│   └─────────────────────────────────────────────────────────────┘   │
│                               │                                     │
│                               ▼                                     │
│   ┌─────────────────────────────────────────────────────────────┐   │
│   │ 220 CHOSE THE SUBSET OF TEMPORAL POINTS AS TEMPORAL POINTS  │   │
│   │ THAT HAVE A GREATEST FREQUENCY AMPLITUDE, WHEREIN A NUMBER  │   │
│   │ OF TEMPORAL POINTS IN THE SUBSET IS TUNABLE                 │   │
│   └─────────────────────────────────────────────────────────────┘   │
└─────────────────────────────────────────────────────────────────────┘
```

FIG. 6

221 IF APPLICATION OF THE SILENCE CONSTRAINT IS SUCCESSFUL, COMPUTE A TOTAL SCORING METRIC FUNCTION ASSOCIATED WITH THE POTENTIAL MATCH TO IDENTIFY A MATCH BETWEEN THE STREAM AUDIO PRINT AND THE KNOWN AUDIO PRINT

222 PERFORM THE SIGNAL ANALYSIS, APPLYING THE SILENCE CONSTRAINT, DETERMINING THE POTENTIAL MATCH, AND COMPUTING THE TOTAL SCORING METRIC FUNCTION, REAL TIME, ON THE AUDIO STREAM AS THE AUDIO STREAM IS RECEIVED

OR

223 GENERATE AN EVENT AS A RESULT OF IDENTIFYING THE MATCH BY NOTIFYING THE APPLICATION OF IDENTIFICATION OF THE MATCH

OR

224 IF APPLICATION OF THE SILENCE CONSTRAINT IS NOT SUCCESSFUL, CONTINUE TO PERFORM THE SIGNAL ANALYSIS, APPLY THE SILENCE CONSTRAINT, DETERMINE THE POTENTIAL MATCH, AND COMPUTE THE TOTAL SCORING METRIC FUNCTION ON A PLURALITY OF SEGMENTS ASSOCIATED WITH THE AUDIO STREAM, WHEREIN THE AUDIO STREAM IS COMPRISED OF THE PLURALITY OF SEGMENTS, UNTIL AT LEAST ONE OF:
    I) THE POTENTIAL MATCH IS DETERMINED
    II) THE POTENTIAL MATCH IS NOT DETERMINED IN ANY OF THE PLURALITY OF SEGMENTS, AND NOTIFYING THE APPLICATION THAT THERE IS NO MATCHING KNOWN AUDIO PRINT, FOR THE KNOWN AUDIO PRINT, OR ANY OF THE KNOWN AUDIO PRINTS IN THE LIBRARY OF KNOWN AUDIO PRINTS.

OR

225 IF APPLICATION OF THE SILENCE CONSTRAINT IS NOT SUCCESSFUL, IDENTIFY THE STREAM AUDIO PRINT AS A POSSIBLE NEW KNOWN AUDIO PRINT TO BE ADDED TO THE LIBRARY OF KNOWN AUDIO PRINTS

FIG. 7

226 CONSTRUCT, AT THE PROCESSOR, THE LIBRARY OF KNOWN AUDIO PRINTS FROM PRE-RECORDED AUDIO STREAM SEGMENTS PROVIDED BY THE APPLICATION, WHEREIN THE LIBRARY OF KNOWN AUDIO PRINTS COMPRISES KNOWN AUDIO PRINTS AND SYNTHETIC AUDIO PRINTS, AND WHEREIN THE KNOWN AUDIO PRINT IS CREATED BY:
DETERMINING PERIODS OF SILENCE IN THE PRE-RECORDED AUDIO STREAM SEGMENTS WHERE ENERGY IS LESS THAN A TUNABLE THRESHOLD, TO CREATE A SILENCE CONSTRAINT ASSOCIATED WITH THE KNOWN AUDIO PRINT;
SELECTING TEMPORAL POINTS WITHIN THE KNOWN AUDIO PRINT; AND
DETERMINING COMPONENT DATA AT THE TEMPORAL POINTS; AND
GENERATE A SYNTHETIC AUDIO PRINT FROM A PLURALITY OF SIMILAR AUDIO STREAMS FROM THE PRE-RECORDED AUDIO STREAM SEGMENTS PROVIDED BY THE APPLICATION

▼

227 GENERATE A SYNTHETIC AUDIO PRINT FROM A PLURALITY OF SIMILAR AUDIO STREAMS THAT THE APPLICATION DESIRES TO DETECT, WHEREIN THE LIBRARY OF KNOWN AUDIO PRINTS COMPRISES AUDIO PRINTS AND SYNTHETIC AUDIO PRINTS

228 PERFORM THE SIGNAL ANALYSIS ON A PLURALITY OF SIMILAR AUDIO STREAMS TO GENERATE A PLURALITY OF STREAM AUDIO PRINTS

▼

229 PERFORM A STATISTICAL COMPARISON ON THE PLURALITY OF STREAM AUDIO PRINTS TO DETERMINE:
        I) COMMON PERIODS OF SILENCE
        II) COMMON FREQUENCIES AMONG THE PLURALITY OF STREAM AUDIO PRINTS
        III) FREQUENCIES WITHIN THE PLURALITY OF STREAM AUDIO PRINTS THAT MOST OFTEN MATCH AT LEAST ONE FREQUENCY ASSOCIATED WITH THE AT LEAST ONE KNOWN AUDIO PRINT

▼

230 GENERATE THE SYNTHETIC AUDIO PRINT FROM:
        I) THE COMMON PERIODS OF SILENCE
        II) THE COMMON FREQUENCIES AMONG THE PLURALITY OF STREAM AUDIO PRINTS
        III) THE FREQUENCIES WITHIN THE PLURALITY OF STREAM AUDIO PRINTS THAT MOST OFTEN MATCH THE AT LEAST ONE FREQUENCY ASSOCIATED WITH THE AT LEAST ONE KNOWN AUDIO PRINT

▼

231 USE THE SYNTHETIC AUDIO PRINT AS THE KNOWN AUDIO PRINT WHEN:
I) DETERMINING THE POTENTIAL MATCH
II) COMPUTING THE TOTAL SCORING METRIC FUNCTION

FIG. 8

232 PERFORM SIGNAL ANALYSIS ON THE AUDIO STREAM TO COMPUTE A STREAM AUDIO PRINT OF THE AUDIO STREAM, WHEREIN THE STREAM AUDIO PRINT IDENTIFIES A PATTERN ASSOCIATED WITH THE AUDIO STREAM, AND WHEREIN THE SIGNAL ANALYSIS IS PERFORMED ON SOUND AND SILENCE WITHIN THE AUDIO STREAM

233 DETERMINE AT LEAST TWO FREQUENCIES WITHIN THE AUDIO STREAM WHEREIN THE AT LEAST TWO FREQUENCIES ARE SELECTED FROM A PLURALITY OF COMPUTED FREQUENCIES

234 DETERMINE A RESPECTIVE AMPLITUDE ASSOCIATED WITH EACH OF THE AT LEAST TWO FREQUENCIES

235 IDENTIFY AN AMPLITUDE RATIO BETWEEN EACH OF THE RESPECTIVE AMPLITUDES

OR

236 IDENTIFY AT LEAST ONE PERIOD OF SILENCE WITHIN THE AUDIO STREAM WHEREIN THE AT LEAST ONE PERIOD OF SILENCE IS IDENTIFIED WHEN ENERGY IS LOWER THAN A PERCENTAGE OF A PEAK AMPLITUDE ASSOCIATED WITH A RESPECTIVE SAMPLE OF THE AUDIO STREAM, WHEREIN THE PERCENTAGE IS TUNABLE

FIG. 9

237 APPLY A SILENCE CONSTRAINT TO MATCH PERIODS OF SILENCE IN THE STREAM AUDIO PRINT TO PERIODS OF SILENCE IN A KNOWN AUDIO PRINT FROM A LIBRARY OF KNOWN AUDIO PRINTS, WHEREIN THE SILENCE CONSTRAINT IS ASSOCIATED WITH THE KNOWN AUDIO PRINT

238 TEMPORALLY MATCH AT LEAST ONE SILENCE PERIOD BETWEEN THE STREAM AUDIO PRINT AND THE KNOWN AUDIO PRINT

FIG. 10

239 DETERMINE A POTENTIAL MATCH BETWEEN THE STREAM AUDIO PRINT AND THE KNOWN AUDIO PRINT

240 DETERMINE THE POTENTIAL MATCH BETWEEN:
    I) AT LEAST TWO FREQUENCIES AND AMPLITUDE RATIOS ASSOCIATED WITH THE STREAM AUDIO PRINT
    II) AT LEAST TWO FREQUENCIES AND AMPLITUDE RATIOS ASSOCIATED WITH THE KNOWN AUDIO PRINT+

FIG. 11

241 RECEIVE, AT THE PROCESSOR, AN AUDIO STREAM FROM AN APPLICATION

242 RECEIVE THE AUDIO STREAM OF AN OUTBOUND TELEPHONE CALL BEFORE THE TELEPHONE CALL IS ANSWERED, WHEREIN THE AUDIO STREAM IS COMPRISED OF AT LEAST ONE OF:
    I)    EARLY MEDIA;
    II)    PRE-CALL AUDIO OF THE TELEPHONE CALL; AND
    III)   RING BACK AUDIO;
WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AT LEAST ONE OF:
    I)    A TELECOMMUNICATION CARRIER;
    II)   A PHONE COMPANY;
    III)  A MOBILE PHONE COMPANY; AND
    IV)  A RING BACK TONE PROVIDER;
AND WHEREIN THE PRE-RECORDED MESSAGES COMPRISE AT LEAST ONE OF:
    I)    VOICE AUDIO;
    II)   A PERIOD OF SILENCE;
    III)  A SPECIAL INFORMATION TONE; AND
    IV)  A RING TONE.

FIG. 12

243 RECEIVE, AT THE PROCESSOR, AN AUDIO STREAM FROM AN APPLICATION

244 RECEIVE THE AUDIO STREAM OF AN OUTBOUND TELEPHONE CALL IMMEDIATELY AFTER THE TELEPHONE CALL IS ANSWERED;
  WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AT LEAST ONE OF:
    I) AN ANSWERING MACHINE; AND
    II) A VOICEMAIL SYSTEM;
  AND WHEREIN THE PRE-RECORDED MESSAGES COMPRISE AT LEAST ONE OF:
    I) A DEFAULT MESSAGE PLAYED BY THE ANSWERING MACHINE IF A PERSON RECEIVING THE TELEPHONE CALL HAS NOT RECORDED THEIR OWN GREETING;
    II) THE VOICEMAIL SYSTEM USED BY A PBX SYSTEM;
    III) THE VOICEMAIL SYSTEM USED BY AN ACD SYSTEM;
    IV) THE VOICEMAIL SYSTEM USED BY A MOBILE CARRIER; THE VOICEMAIL SYSTEM USED BY A TELEPHONE COMPANY;
    V) ANOTHER TYPE OF AUTOMATED ANSWERING MESSAGE PLAYED WHEN THE PERSON RECEIVING THE TELEPHONE CALL DOES NOT ANSWER IN PERSON; AND
    VI) A BEEP OR TONE PLAYED BY THE ANSWERING MACHINE OR THE VOICEMAIL SYSTEM INDICATING THAT A CALLER IS TO RECORD A MESSAGE.

245 RECEIVE, AT THE PROCESSOR, AN AUDIO STREAM FROM AN APPLICATION

246 RECEIVE THE AUDIO STREAM OF AN OUTBOUND TELEPHONE CALL AFTER THE TELEPHONE CALL IS ANSWERED;
  WHEREIN THE KNOWN AUDIO PRINT FROM THE LIBRARY OF KNOWN AUDIO PRINTS COMPRISES A LIBRARY OF PRE-RECORDED MESSAGES REPRESENTING MESSAGES PLAYED BY AN INTERACTIVE VOICE RESPONSE (IVR) SYSTEM;
  AND WHEREIN THE PRE-RECORDED MESSAGES COMPRISE AT LEAST ONE OF:
    I) VOICE PROMPTS PLAYED BY THE IVR; AND
    II) TONES PLAYED BY THE IVR

FIG. 13

METHOD OF MATCHING A DIGITIZED STREAM OF AUDIO SIGNALS TO A KNOWN AUDIO RECORDING

BACKGROUND

There are various applications that process audio data. Telephony systems can analyze early media or pre-call audio of outbound calls to detect carrier messages and accurately disposition call attempts. Telephony systems can analyze call audio to determine if a phone call is answered by a human or by an answering machine. Telephony systems can analyze call audio from remote IVR systems to match IVR prompts and allow automated traversal of IVR menus. Smart phone based applications may use their microphones to digitize audio sounds. Cable set top boxes may analyze audio portions of television signals to detect content such as commercials and programming. Internet devices and routers can intercept audio streams, look for certain messages, and detect the match of automated messages. These various applications process audio data, and report the results of the processing.

SUMMARY

According to one embodiment disclosed herein, in a method for matching a digitized stream of audio signals to a known audio recording, a processor receives an audio stream from an application. The method, via the processor, performs signal analysis on the audio stream to compute a stream audio print of the audio stream, where the stream audio print identifies a pattern associated with the audio stream. The signal analysis is performed on sound and silence within the audio stream. The method, via the processor, applies a silence constraint to match periods of silence in the stream audio print to periods of silence in a known audio print from a library of known audio prints. The silence constraint is associated with the known audio print. The method, via the processor, determines a potential match between the stream audio print and the known audio print. If application of the silence constraint is successful, the method, via the processor, computes a total scoring metric function associated with the potential match to identify a match between the stream audio print and the known audio print.

In one aspect of embodiments disclosed herein, when the method computes the total scoring metric function, the method overlays the stream audio print with the known audio print. The method computes a scoring metric function at a subset of temporal points, and sums a result of the scoring metric function at each of the subset of temporal points to create a total score metric. The total score metric is a result of the total scoring metric function.

In one aspect of embodiments disclosed herein, when the method computes the total scoring metric function, the method computes the scoring metric function at a temporal point between component data from the stream audio print, and component data from the known audio print. The component data from the stream audio print comprises a first frequency associated with the stream audio print, a second frequency associated with the stream audio print, and a first amplitude ratio associated with the first frequency and the second frequency. The component data from the known audio print comprises a third frequency associated with the known audio print, a fourth frequency associated with the known audio print, and a second amplitude ratio associated with the third frequency and the fourth frequency.

In one aspect of embodiments disclosed herein, the method then calculates a first component as a difference between the first frequency and the third frequency, and applies a first tunable parameter to scale the first component. The method calculates a second component as a difference between the second frequency and the fourth frequency, and applies a second tunable parameter to scale the second component. The method calculates a third component as a difference between the first amplitude ratio and the second amplitude ratio, and applies a third tunable parameter to scale the third component. The method then sums the first component, the second component, and the third component to calculate the scoring function. Each of the first, second and third tunable parameters is chosen to scale an influence that the respective first, second, and third component has on the result of the scoring metric function.

In one aspect of embodiments disclosed herein, the method determines the match between the stream audio print and the known audio print when the total scoring metric is a low value, where the low value is less than a tunable threshold.

In one aspect of embodiments disclosed herein, when the method computes the total scoring metric function, the method chooses the subset of temporal points as temporal points that are not periods of silence. Alternatively, the method chooses the subset of temporal points as temporal points that have the greatest frequency amplitude. The number of temporal points in the subset is tunable.

In one aspect of embodiments disclosed herein, the method performs the signal analysis, applies the silence constraint, determines the potential match, and computes the total scoring metric function, real time, on the audio stream as the audio stream is received.

In one aspect of embodiments disclosed herein, if the application of the silence constraint is not successful, the method continues to perform the signal analysis, apply the silence constraint, determine the potential match, and compute the total scoring metric function on a plurality of segments associated with the audio stream until the potential match is, or is not determined in any of the plurality of segments. The audio stream is comprised of the plurality of segments. If the potential match is not determined in any of the plurality of segments, for any of one or more known audio prints in the library of known audio prints, the method notifies the application that there is no matching known audio print.

In one aspect of embodiments disclosed herein, if application of the silence constraint is not successful, the method identifies the stream audio print as a possible new known audio print to be added to the library of known audio prints.

In one aspect of embodiments disclosed herein, the method generates an event as a result of identifying the match. The event may be notifying the application of identification of the match.

In one aspect of embodiments disclosed herein, the method constructs, at the processor, the library of known audio prints by selecting and cropping snippets of audio streams containing audio that the application desires to detect. The method generates a synthetic audio print from a plurality of similar audio streams containing audio that the application desires to detect, where the library of known audio prints comprises audio prints and synthetic audio prints.

In one aspect of embodiments disclosed herein, the method constructs, at the processor, the library of known audio prints from pre-recorded audio stream segments provided by the application. The library of known audio prints comprises known audio prints and synthetic audio prints. The known audio print is created by determining periods of silence in the pre-recorded audio stream segments where energy is less than a tunable threshold, to create a silence constraint associated with the known audio print. The method selects temporal points within the known audio print, and determines component data at the temporal points. The method generates a synthetic audio print from a plurality of similar audio streams from the pre-recorded audio stream segments provided by the application.

In one aspect of embodiments disclosed herein, when the method generates the synthetic audio print, the method performs the signal analysis on a plurality of similar audio streams to generate a plurality of stream audio prints, where the plurality of stream audio prints match at least one known audio print. The method performs a statistical comparison on the plurality of stream audio prints to determine common frequencies among the plurality of stream audio prints, and frequencies within the plurality of stream audio prints that most often match at least one frequency associated with at least one known audio print. The method generates the synthetic audio print from the common frequencies among the plurality of stream audio prints, and the frequencies within the plurality of stream audio prints that most often match at least one frequency associated with at least one known audio print.

In one aspect of embodiments disclosed herein, the method uses the synthetic audio print as the known audio print when determining the potential match, and when computing the total scoring metric function.

In one aspect of embodiments disclosed herein, when the method performs the signal analysis on the audio stream, the method determines at least two frequencies within the audio stream where the frequencies are selected from a plurality of computed frequencies. The method determines a respective amplitude associated with each of the frequencies, and identifies an amplitude ratio between each of the respective amplitudes.

In one aspect of embodiments disclosed herein, when the method performs the signal analysis on the audio stream, the method identifies at least one period of silence within the audio stream. The period of silence is identified when energy is lower than a percentage of a peak amplitude associated with a respective sample of the audio stream. The percentage is tunable.

In one aspect of embodiments disclosed herein, when the method applies the silence constraint to the potential match, the method temporally matches at least one silence period between the stream audio print and the known audio print.

In one aspect of embodiments disclosed herein, when the method determines the potential match between the stream audio print and the known audio print from the library of known audio prints, the method determines the potential match between at least two frequencies and amplitude ratios associated with the stream audio print, and at least two frequencies and amplitude ratios associated with the known audio print.

In one aspect of embodiments disclosed herein, when the method receives the audio stream, the method receives the audio stream of an outbound telephone call before the telephone call is answered. The audio stream is comprised of at least one of early media, pre-call audio of the telephone call, and ring back audio. The known audio print from the library of known audio prints comprises a library of pre-recorded messages representing messages played by at least one of a telecommunication carrier, a phone company, a mobile phone company, and a ring back tone provider. The pre-recorded messages comprise at least one of voice audio, a period of silence, a special information tone, and a ring tone.

In one aspect of embodiments disclosed herein, when the method receives the audio stream, the method receives the audio stream of an outbound telephone call immediately after the telephone call is answered. The known audio print from the library of known audio prints comprises a library of pre-recorded messages representing messages played by at least one of an answering machine, and a voicemail system. The pre-recorded messages comprise at least one of a default message played by the answering machine if a person receiving the telephone call has not recorded their own greeting, the voicemail system used by a Private Branch Exchange (PBX) system, the voicemail system used by an Automatic Call Distributor (ACD) system, the voicemail system used by a mobile carrier, the voicemail system used by a telephone company, another type of automated answering message played when the person receiving the telephone call does not answer in person, and a beep or tone played by the answering machine or the voicemail system indicating that a caller is to record a message.

In one aspect of embodiments disclosed herein, when the method receives the audio stream, the method receives the audio stream of an outbound telephone call after the telephone call is answered. The known audio print from the library of known audio prints comprises a library of pre-recorded messages representing messages played by an interactive voice response (IVR) system. The pre-recorded messages comprise at least one of voice prompts played by the IVR, and tones played by the IVR.

System and computer program products corresponding to the above-summarized methods are also described and claimed herein.

BRIEF DESCRIPTION OF THE SEVERAL VIEWS OF THE FIGURES

FIG. 4 is a flowchart illustrating an embodiment of a method for matching a digitized stream of audio signals to a known audio recording where the method computes a total scoring metric function, according to embodiments disclosed herein.

FIG. 5a is a flowchart illustrating an embodiment of a method for matching a digitized stream of audio signals to a known audio recording where the method computes a scoring metric function at a subset of temporal points, according to embodiments disclosed herein.

FIG. 6 is a flowchart illustrating an embodiment of a method for matching a digitized stream of audio signals to a known audio recording where the method computes a scoring metric function at a subset of temporal points, and chooses the subset of temporal points as temporal points that are not periods of silence, according to embodiments disclosed herein.

FIG. 7 is a flowchart illustrating an embodiment of a method for matching a digitized stream of audio signals to a known audio recording where the method determines if application of the silence constraint is successful or not, according to embodiments disclosed herein.

FIG. 8 is a flowchart illustrating an embodiment of a method for matching a digitized stream of audio signals to a known audio recording where the method constructs the library of known audio prints, according to embodiments disclosed herein.

FIG. 9 is a flowchart illustrating an embodiment of a method for matching a digitized stream of audio signals to a known audio recording where the method performs signal analysis on the audio stream, according to embodiments disclosed herein.

FIG. 10 is a flowchart illustrating an embodiment of a method for matching a digitized stream of audio signals to a known audio recording where the method applies a silence constraint, according to embodiments disclosed herein.

FIG. 11 is a flowchart illustrating an embodiment of a method for matching a digitized stream of audio signals to a known audio recording where the method determines a potential match between the stream audio print and the known audio print, according to embodiments disclosed herein.

FIG. 12 is a flowchart illustrating an embodiment of a method for matching a digitized stream of audio signals to a known audio recording where the method receives the audio stream of an outbound telephone call before the call is answered.

FIG. 13 is a flowchart illustrating an embodiment of a method for matching a digitized stream of audio signals to a known audio recording where the method receives the audio stream of an outbound telephone call immediately after the call is answered.

DETAILED DESCRIPTION

Figure 1:
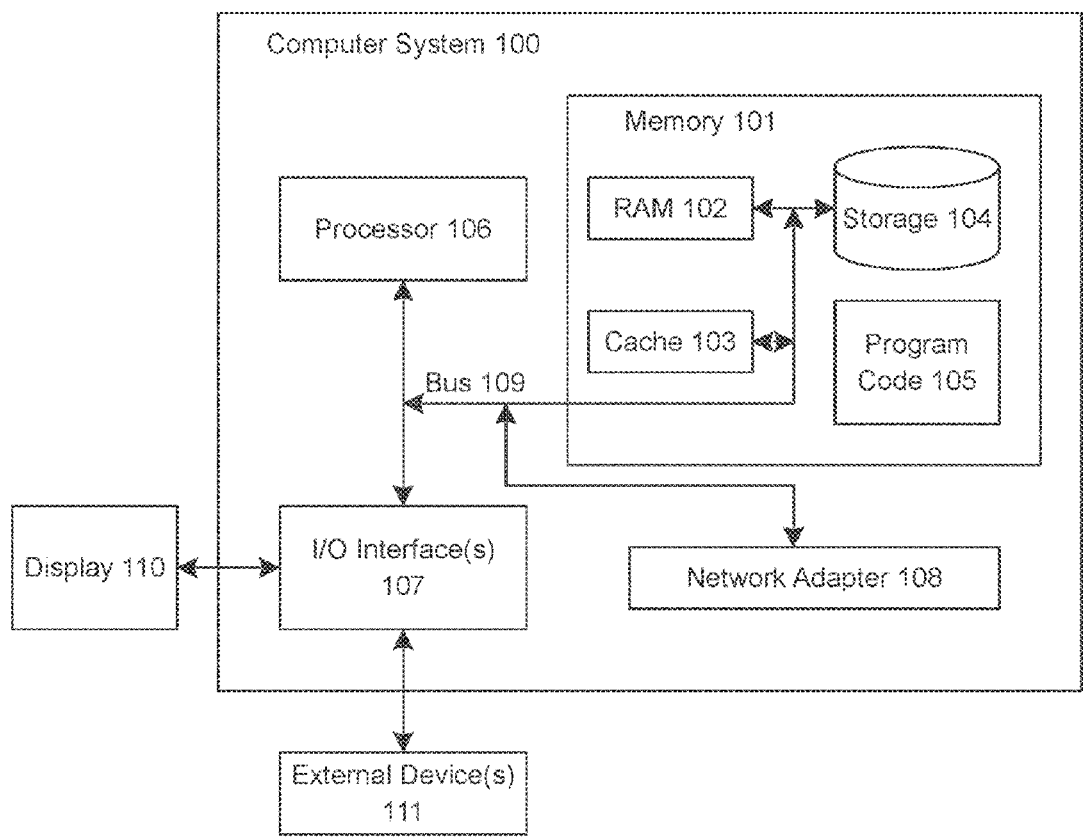
FIG. 1 illustrates an embodiment of a system for matching a digitized stream of audio signals to a known audio recording, according to embodiments disclosed herein.

Embodiments disclosed herein provide matching a digitized stream of audio signals to a known audio recording. The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein.

Embodiments disclosed herein can take the form of an entirely hardware embodiment, an entirely software embodiment or an embodiment containing both hardware and software elements. In a preferred embodiment, embodiments disclosed herein are implemented in software, which includes but is not limited to firmware, resident software, microcode, etc.

Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments disclosed herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a system for matching a digitized stream of audio signals to a known audio recording according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or with one or more external devices 111, such as a display 110, via I/O interfaces 107. The memory 101 may include computer readable media in the form of volatile memory, such as random access memory (RAM) 102 or cache memory 103, or non-volatile storage media 104. The memory 101 may include at least one program product having a set of at least one program code modules 105 that are configured to carry out the functions of embodiments of the present invention when executed by the processor 106. The computer system 100 may communicate with one or more networks via network adapter 108.

Figure 2:
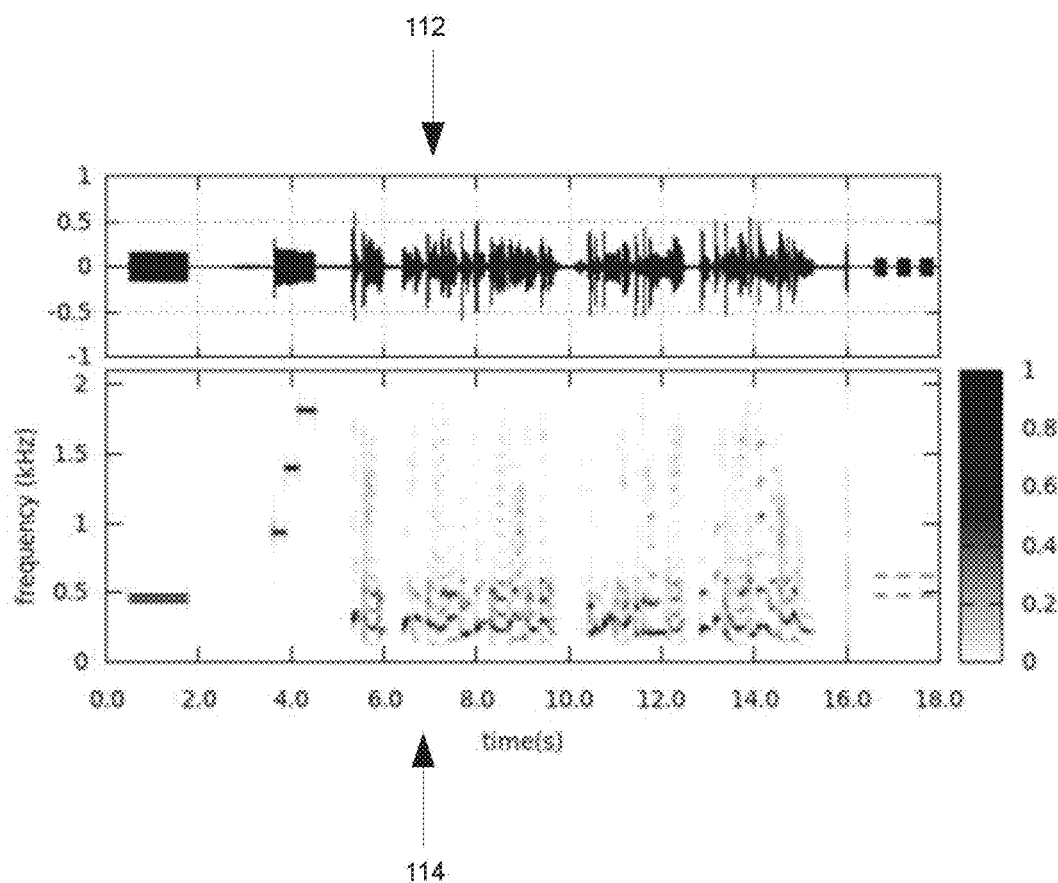
FIG. 2 illustrates an audio waveform with its corresponding spectrogram, according to embodiments disclosed herein.

FIG. 2 illustrates an example waveform 112 and frequency response 114 of a telephony Early Media example. "Early Media" refers to audio heard by a caller once a call is placed, but before it is answered by the party being called (e.g., ringing, a busy signal, and messages such as "The number you are trying to reach has been disconnected"). The waveform 112 (starting at time=0) begins with a standard ring tone, a set of three special information tones (SIT), some human voice audio, and three fast busy tones. Audible telephony call progress tones are standards based. A standard ring tone is delivered as an audio signal with dual overlapped frequencies of equal amplitude, one at 440 Hz and the other at 480 Hz, with 2 seconds on and 4 seconds off. A busy tone consists of dual frequencies at 480 Hz and 620 Hz, for 0.5 seconds on and 0.5 seconds off. A fast busy, or reorder tone, has the same frequency characteristics as a busy tone, however it is shorter, 0.25 seconds on, and 0.25 seconds off. Special information tones consist of three, single frequency, rising tones. The frequency and duration of these three tones can be modified to indicate different signaling information. Dual tone multi-frequency tones (DTMF) are another example of dual tones that carry signaling information. Voice audio is characterized by a continuously changing set of frequencies. Any given segment of voice audio may contain numerous frequencies with varying amplitude.

Figure 3:
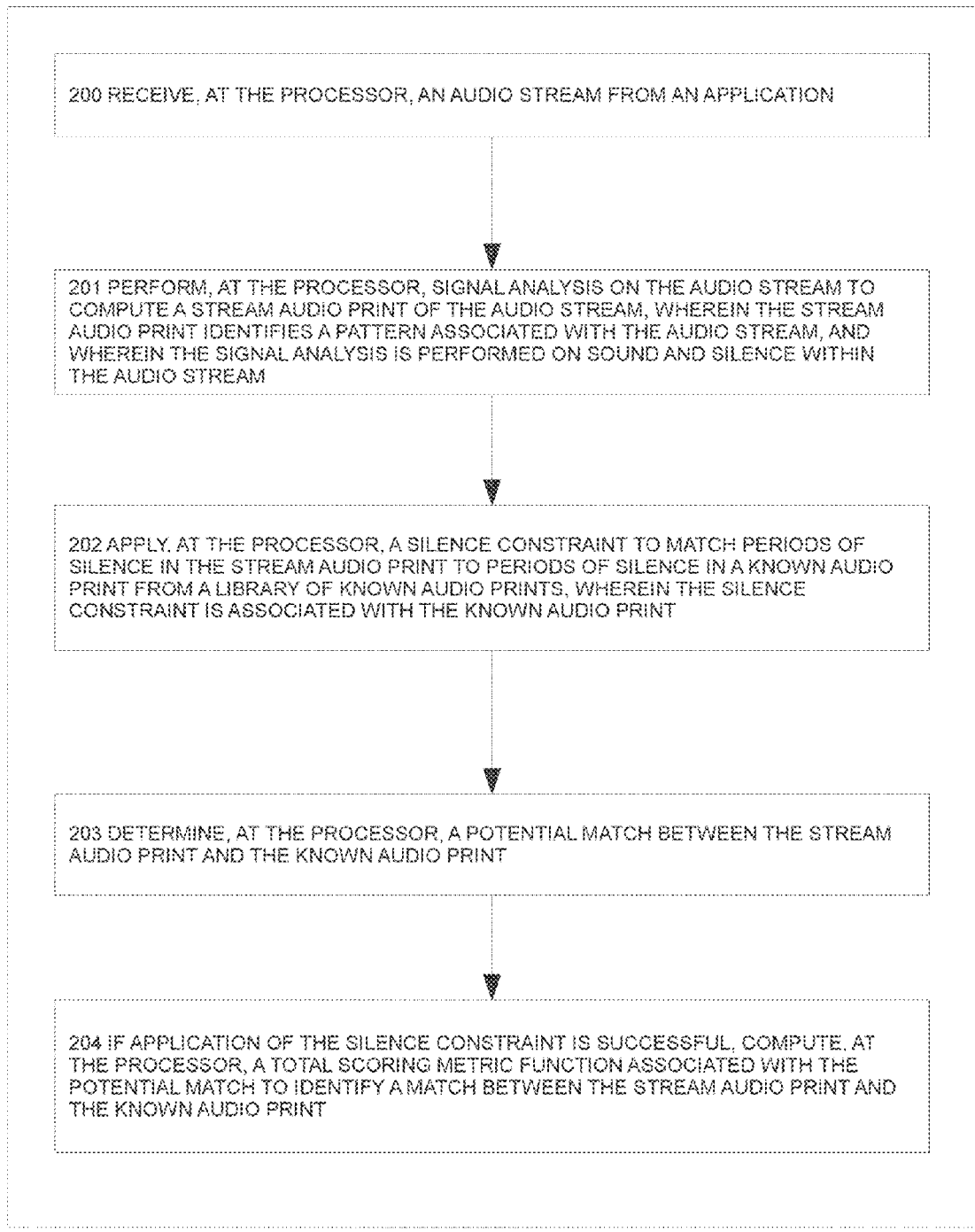
FIG. 3 is a flowchart illustrating an embodiment of a method for matching a digitized stream of audio signals to a known audio recording, according to embodiments disclosed herein.

FIG. 3 is a flowchart of an example embodiment of embodiments disclosed herein for matching a digitized stream of audio signals to a known audio recording according. In 200, the method receives, at a processor 106, an audio stream from an application. In an example embodiment, the audio stream may be early media or pre-call audio received when placing an outbound telephone call. The audio stream may also be a recorded telephony message from an Interactive Voice Response (IVR) system, Private Branch Exchange (PBX), answering machine, Automatic Call Distributor (ACD), or other automated telephone messaging systems. In another example embodiment, the audio stream may be a radio program, live or recorded, where matching is performed to determine if, for example, commercials were played during the radio program. The matching may be performed to determine if the content of the commercials was correct, if the commercial was played a correct number of times, at the correct portions of the ratio program, etc. The audio stream may also be received via the Internet. The audio stream may also be received from a microphone of a smart phone as part of an application.

In 201, the method performs, at the processor 106, signal analysis on the audio stream to compute a stream audio print of the audio stream. The stream audio print identifies a pattern associated with the audio stream. The signal analysis is performed on sound and silence within the audio stream. The signal analysis may be performed using a variety of methods. In an example embodiment, given an audio stream (i.e., a digital audio signal):

$x(t_i), i=0,\ldots,\infty$

The audio stream is sampled at a rate of N samples per second. Then, a discrete Fourier transform (DFT) is computed of overlapped, windowed segments of the audio signal of length M, overlapped by length L. In an example embodiment, a Hamming window is used, but any number of other windows may be chosen. The DFT produces a spectrogram (i.e., the frequency response 114), with frequency and amplitude components of the signal at discrete points in time. The choice of M and L is tunable, and may impact the calculation results. For example, given an audio stream, sampled at N=8000 samples per second, selection of a window length M=800 will produce a frequency resolution of N/M, or 10 Hz, when the DFT is computed. Selection of L=160 samples, results in the temporal resolution of 160/8000, or 0.02 seconds.

In another example embodiment, for ringing tones and special information tones (SIT tones), the method computes a stream audio print from the tone characteristics without any sampling of examples. For example, a standard ring tone heard when placing an outbound telephone call may be of 2 seconds duration, with two overlapped frequencies, at 440 Hz and 480 Hz, followed by a period of silence. The amplitude of the two frequencies should be the same, so the ratio between the two is unity.

In 202, the method applies, at the processor 106, a silence constraint to match periods of silence in the stream audio print to periods of silence in a known audio print from a library of known audio prints, where the silence constraint is associated with the known audio print. In an example embodiment, the signal analysis is computed on voice, SIT and silence portions of the audio stream. Computation of the signal analysis produces the stream audio print that is then compared to a known audio print from a library of known audio prints. In an example embodiment, prior to the comparison, a silence constraint is applied to the audio stream to match periods of silence in the audio stream to periods of silence in the known audio print. In another example embodiment, the periods of silence in the audio stream must match, temporally, the periods of silence in the known audio print. In other words, the periods of silence in the audio stream must occur at the same points where the periods of silence occur in the known audio print. In yet an example embodiment, if the periods of silence in the audio stream do not match the periods of silence in the known audio print, then the method determines a match has not been made between the audio stream and the known audio print. In an example embodiment, the method continues to compare the stream audio print at each point in time with a plurality of known audio prints from the library of known audio prints to determine if any of the known audio prints are detected by the method. For example, the method applies the silence constraint to the stream audio print. If application of the silence constrain is successful with one of the known audio prints, the method then computes the scoring function. If application of the silence constraint is not successful, then the method continues to apply the silence constraint using other known audio prints from the library of known audio prints.

In 203, the method determines, at the processor 106, a potential match between the stream audio print and the known audio print. In an example embodiment, the method performs the signal analysis, and applies the silence constraint to the audio stream. If the comparison is successful, meaning the audio stream has periods of silence at the same temporal points as the known audio print, then the method determines a potential match has been made, and continues the comparison by computing the total scoring metric function.

FIG. 4 is a flowchart of an example embodiment for computing a total scoring metric function associated with the potential match.

In 204, as noted above if application of the silence constraint is successful, the method computes, at the processor 106, a total scoring metric function associated with the potential match, to identify a match between the stream audio print and the known audio print.

In 205, the method overlays the stream audio print with the known audio print. The method overlays the stream audio print with the known audio print to determine if there are matches between the stream audio print and known audio print, at the same temporal points. In an example embodiment, the method may only be interested in detecting a subset of the known audio prints from the library of known audio prints, and performs the comparison to detect only those known audio prints that the method is interested in detecting. In another example embodiment, the method may be interested in detecting any of the known audio prints from the library of known audio prints, and performs the comparison using all of the known audio prints in the library of known audio prints.

In 206, the method computes a scoring metric function at a subset of temporal points. In an example embodiment, the method compares the stream audio print at each point through the use of a scoring metric function such as the following example:

$$f(A_p(t_i), A(t_i)) = \alpha(\omega_{p1}-\omega_1) + \beta(\omega_{p2}-\omega_2) + \gamma(a_{pr}-a_r)$$

where $A_p(t_i)$ refers to the known audio print, $A(t_i)$ refers to the stream audio print, and $f(A_p(t_i), A(t_i))$ is the scoring metric function which computes a measure of the closeness of the known audio print and the stream audio print at the temporal point. Other examples of scoring metric functions may also be used.

In 207, the method sums a result of the scoring metric function at each of the subset of temporal points to create a total score metric. The total score metric is a result of the total scoring metric function. In an example embodiment, the summing equation for the total scoring metric function at each of the subset of temporal points may be an equation such as:

$$\Omega(t_k) = \frac{1}{N_p} \sum_{i=0}^{N_m} \int (A_p(t_i), A(t_i))$$

where total score metric tends to zero when the frequency components of the stream audio print and the known audio print match, and their amplitude ratios are equivalent. Other calculations may also be used to create the total score metric.

Figure 5B:
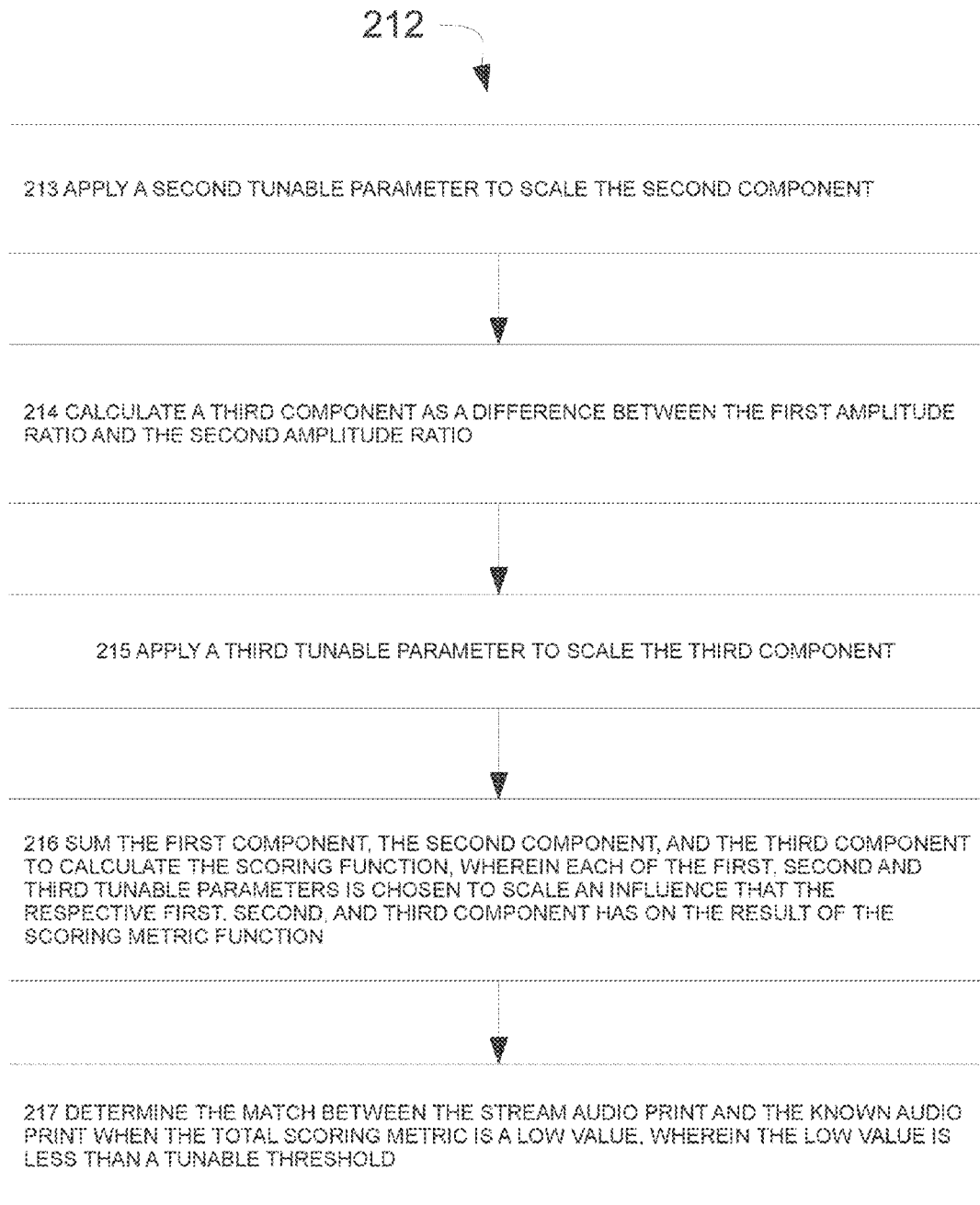
FIG. 5b a continuation of the flowchart of FIG. 5a illustrating an embodiment of a method for matching a digitized stream of audio signals to a known audio recording where the method computes a scoring metric function at a subset of temporal points, according to embodiments disclosed herein.

FIG. 5a is a flowchart of an example embodiment for computing a scoring metric function at a subset of temporal points.

In 208, the method computes a scoring metric function at a subset of temporal points. In an example embodiment, the method performs signal analysis on the audio stream to produce a set of frequency and amplitude data for each temporal point in the subset of temporal points. The method then computes the scoring metric function at each temporal point using the frequency and amplitude data.

In 209, the method computes the scoring metric function, at a temporal point, between component data from the stream audio print, and component data from the known audio print. In this example embodiment, the component data from the stream audio print comprises:

i) a first frequency associated with the stream audio print,
  ii) a second frequency associated with the stream audio print, and
  iii) a first amplitude ratio associated with the first frequency and the second frequency.

The component data from the known audio print comprises:

i) a third frequency associated with the known audio print,
  ii) a fourth frequency associated with the known audio print, and
  iii) a second amplitude ratio associated with the third frequency and the fourth frequency. In an example embodiment, when the method performs a signal analysis to produce a set of points for each temporal point in the subset of temporal points, each set of points comprises two frequencies associated with the stream audio print (i.e., the first frequency and the second frequency) and an amplitude ratio of the two frequencies. The known audio print also has two frequencies (i.e., the third frequency and the fourth frequency) associated with the known audio print, and an amplitude ratio associated with the two known audio print frequencies. In another example embodiment, the method may compute more than two frequencies for the stream audio print. In this scenario, the known audio print would likewise also have more than two frequencies.

In 210, the method calculates a first component as a difference between the first frequency and the third frequency. As noted above in 207, an example of calculating the scoring metric function at each of the subset of temporal points may be $$f(A_p(t_i), A(t_i)) = \alpha(\omega_{p1}-\omega_1) + \beta(\omega_{p2}-\omega_2) + \gamma(a_{pr}-a_r)$$

In an example embodiment, the method calculates the difference between the $\omega_{p1}$ (i.e., the third frequency associated with the known audio print), and $\omega_1$ (i.e., the first frequency associated with the stream audio print).

In 211, the method applies a first tunable parameter to scale the first component. In an example embodiment, the method applies $\alpha$ as the first tunable parameter to the $(\omega_{p1}-\omega_1)$ equation.

In 212, the method calculates a second component as a difference between the second frequency and the fourth frequency. In an example embodiment, the method calculates the difference between $\omega_{p2}$ (i.e., the fourth frequency associated with the known audio print) and $\omega_2$ (i.e., the second frequency associated with the stream audio print).

In 213, the method applies a second tunable parameter to scale the second component. In an example embodiment, the method applies $\beta$ as the second tunable parameter to the $(\omega_{p2}-\omega_2)$ equation.

In 214, the method calculates a third component as a difference between the first amplitude ratio and the second amplitude ratio. In an example embodiment, the method calculates the difference between $a_{pr}$ (i.e., second amplitude ratio) and $a_r$ (i.e., the first amplitude ratio).

In 215, the method applies a third tunable parameter to scale the third component. In an example embodiment, the method applies $\gamma$ as the third tunable parameter to the $(a_{pr}-a_r)$ equation.

In 216, the method sums the first component, the second component, and the third component to calculate the scoring metric function. Each of the first, second and third tunable parameters is chosen to scale an influence that the respective first, second, and third component has on the result of the scoring metric function. In an example embodiment, the first tunable parameter, for example $\alpha$, is chosen to scale an influence that the $(\omega_{p1}-\omega_1)$ equation has on the result of the scoring metric function, the second tunable parameter, for example $\beta$, is chosen to scale an influence that the $(\omega_{p2}-\omega_2)$ equation has on the result of the scoring metric function, and the third tunable parameter, for example γ, is chosen to scale an influence that the $(a_{pr}-a_r)$ equation has on the result of the scoring metric function.

In 217, the method determines the match between the stream audio print and the known audio print when the total scoring metric is a low value, where, for example, the low value is less than a tunable threshold. In an example embodiment, the difference between the stream audio print and known audio print frequencies should be near zero, as well as the difference between the stream audio print and known audio print amplitude ratios.

FIG. 6 is a flowchart of an example embodiment for computing a scoring metric function at a subset of temporal points.

In 218, the method computes a scoring metric function at a subset of temporal points. In an example embodiment, the method performs a signal analysis to produce a set of points for each temporal point in the subset of temporal points. The method then applies the silence constraint to the set of points to determine if there is a match between periods of silence in the audio stream and periods of silence in the known audio print. If there is a match (meaning application of the silence constraint is successful), then the method computes the scoring metric function at each of the subset of temporal points. In an example embodiment, the method may choose the subset of temporal points at which to compute the scoring metric function. For example, the subset of temporal points may be chosen at the time the known audio print is created. The technique for choosing the subset of temporal points may vary, for example, the method may select the most "energetic" non-silence points (according to a tunable value) for the number of points to chose. In another example embodiment, the method may choose the points that have the biggest difference between a first and second frequency, or points that have a specific frequency, as one of the frequencies, etc.

In 219, the method chooses the subset of temporal points as temporal points that are not periods of silence. In an example embodiment, the method chooses the subset of temporal points that have SIT (Special Information Tones), voice audio, call progress tones, etc., but does not choose temporal points that contains what the method has determined to be periods of silence within the audio stream. In another example embodiment, the subset of temporal points may be chosen to fulfill specific requirements, such as 5 points per second of non-silent audio in the audio stream.

In 220, the method chooses the subset of temporal points as temporal points that have the greatest frequency amplitude, where the number of temporal points in the subset is tunable. In an example embodiment, the method chooses the subset of temporal points as temporal points that have been determined to have the greatest frequency amplitude. Those temporal points with the greatest frequency amplitude may be chosen, for example, as the least likely to be obscured by the presence of noise.

FIG. 7 is a flowchart of an example embodiment for computing a total scoring metric function associated with the potential match to identify a match between the stream audio print and the known audio print, if application of the silence constraint is successful.

In 221, if application of the silence constraint is successful, the method computes a total scoring metric function associated with the potential match to identify a match between the stream audio print and the known audio print.

In 222, the method performs the signal analysis, applies the silence constraint, determines the potential match, and computes the total scoring metric function, real time, on the audio stream as the audio stream is received. In an example embodiment, the known audio prints are pre-recorded short audio segments, and the method determines the match between the known audio print, and segments within a longer audio stream as the audio stream is received in real time. In another example embodiment, the steps of performing the signal analysis, applying the silence constraint, determining the potential match, and computing the total scoring metric function are optimized for voice audio and telephony tone based on signaling mechanisms such as DTMF, SIT, ring and busy tones. In yet another example embodiment, the above-mentioned steps may be performed on other types of audio signals. In yet still another example embodiment, the above-mentioned steps may be performed on a recorded audio message.

In 223, the method generates an event as a result of identifying the match by notifying the application of identification of the match. In an example embodiment, if the method determines a match between the stream audio print and known audio print, the method generates an event, such as notifying the application (from which the audio stream was received) of identification of the match. For example, the method may be performed on the audio received after placing a telephone call but before it is answered, which is known as early media or pre-call audio. In this example, the library of known audio prints might comprise carrier voice messages indicating, for example, the fact that the number is disconnected, or that the subscriber is not available. In this scenario, the method reports back if a match is made to one of these carrier voice messages and, if so, to which message, so that the application can properly update records about the number it has dialed.

In another example embodiment, the method notifies the application of the match as well as a number of times the match was made in the audio stream. For example, the method may be performed on a radio program to determine if content (such as a commercial advertisement) was played within the radio program, correctly, the correct number of times, and at correct points in the radio program. In this scenario, the method reports back both the match as well as the number of times the match was made and the temporal points within the radio program at which the match was made. The radio program may be live, or it may be pre-recorded. In another example embodiment, the method may be performed to determine if commercial advertisements were played within television content, or content streamed over the Internet.

In another example embodiment, the method may be used for scripting an interactive voice response application (IVR) to interact with another IVR by detecting voice prompts, and generating an event that identifies what the next response should be.

Alternatively, in 224, if application of the silence constraint is not successful, the method continues to perform the signal analysis, apply the silence constraint, determine the potential match, and compute the total scoring metric function on a plurality of segments associated with the audio stream, where the audio stream is comprised of the plurality of segments, until at least one of:

i) the potential match is determined, or
ii) the potential match is not determined in any of the plurality of segments.

The method then notifies the application that there is no matching known audio print for the known audio print, or any of the known audio prints in the library of known audio prints. In an example embodiment, the method compares the stream audio print to the known audio print to determine a match at a temporal point in the audio stream. If a match is not determined, the method continues through the audio stream (i.e., other temporal points) until either a match has been determined, or the audio stream has been completely traversed and processed. If no match has been made throughout the entirety of the audio stream for any of the known audio prints, the method notifies the application (from which the audio stream was received) that there was no matching known audio print discovered within the audio stream.

Alternatively, in 225, if application of the silence constraint is not successful, the method identifies the stream audio print as a possible new known audio print to be added to the library of known audio prints. In other words, if the method computes a stream audio print, and determines that there is no match for the stream audio print within the library of known audio prints, then the method may identify that stream audio print as a possible new known audio print that needs to be analyzed and added to the library.

FIG. 8 is a flowchart of an example embodiment for constructing, at the processor, the library of known audio prints by selecting and cropping snippets of audio streams containing audio that the application desires to detect.

In 226, the method constructs, at the processor, the library of known audio prints by creating audio prints from pre-recorded audio streams containing audio that the application desires to detect. This is performed by determining periods of silence where the energy is less than a tunable threshold to create a silence constraint associated with this known audio print. The method then selects temporal points, and determines component data at those points to create the known audio print. The method may also generate a synthetic audio print from a plurality of similar audio streams containing audio that the application desires to detect, where the library of known audio prints comprises audio prints and synthetic audio prints.

In an example embodiment, the method constructs, at the processor, the library of known audio prints from pre-recorded audio stream segments provided by the application. The library of known audio prints comprises known audio prints and synthetic audio prints. The known audio print is created by determining periods of silence in the pre-recorded audio stream segments where energy is less than a tunable threshold, to create a silence constraint associated with the known audio print. The method selects temporal points within the known audio print, and determines component data at the temporal points. In an example embodiment, the method determines component data as described above in FIGS. 5a and 5b. The method generates a synthetic audio print from a plurality of similar audio streams from the pre-recorded audio stream segments provided by the application.

In 227, the method generates a synthetic audio print from a plurality of similar audio streams containing audio that the application desires to detect, where the library of known audio prints comprises audio prints and synthetic audio prints. In an example embodiment, the method may determine a similarity between a plurality of audio streams, and generate a synthetic audio print from the plurality of similar audio streams to use as a known audio print in the library of known audio print. In another example embodiment, the generated synthetic audio print is a "better" audio print than a known audio print from the library of known audio prints.

In 228, the method performs the signal analysis on a plurality of similar audio streams to generate a plurality of stream audio prints. In an example embodiment, the method performs the signal analysis on the plurality of audio streams to generate a plurality of stream audio prints to utilize when generating the synthetic audio print. In an example embodiment, the plurality of similar audio streams matches only one known audio print. In another example embodiment, the plurality of similar audio streams match more than one known audio print.

In 229, the method performs a statistical comparison on the plurality of stream audio prints to determine:
    i) common periods of silence,
    ii) common frequencies among the plurality of stream audio prints, and
    iii) frequencies within the plurality of stream audio prints that most often match at least one frequency associated with at least one known audio print.

In an example embodiment, the method performs the statistical comparison on the plurality of stream audio prints to determine the most common frequencies among the plurality of stream audio prints as well as the frequencies that most often match at least one frequency associated with the known audio print or known audio prints in an effort to generate the "better" known audio print.

In 230, the method generates the synthetic audio print from:
    i) the common periods of silence,
    ii) the common frequencies among the plurality of stream audio prints, and
    iii) the frequencies within the plurality of stream audio prints that most often match at least one frequency associated with at least one known audio print.

In an example embodiment, the method uses the common periods of silence to apply the silence constraint, and the common frequencies and the frequencies that most often match the known audio prints as the frequencies used to compute the total scoring metric function. The method uses these frequencies also to compute the amplitude ratio that is used in the total scoring metric function when the scoring metric function is used to determine a match between a stream audio print and a known audio print (i.e., in this case, the known audio print would be the synthetic audio print).

In 231, the method uses the synthetic audio print as the known audio print when determining the potential match, and when computing the total scoring metric function. In other words, the method generates the synthetic audio print, and then uses that synthetic audio print as one of the known audio prints (i.e., a plurality of frequencies and an amplitude ratio between the plurality of frequencies) in the library of known audio prints.

FIG. 9 is a flowchart of an example embodiment for performing signal analysis on the audio stream to compute a stream audio print of the audio stream.

In 232, the method performs signal analysis on the audio stream to compute a stream audio print of the audio stream, where the stream audio print identifies a pattern associated with the audio stream, and where the signal analysis is performed on sound and silence within the audio stream.

In 233, the method determines at least two frequencies within the audio stream where at least two frequencies are selected from a plurality of computed frequencies. In an example embodiment, the method performs the signal analysis on the audio stream using the process explained above in 201. From the frequencies computed, the method selects at least two frequencies. The method selects at least two frequencies because at least two frequencies are required to analyze, for example, call progress dual frequency signals. In an example embodiment, the method selects the most energetic or significant frequencies, for example, at least two of the most energetic frequencies, and their respective amplitudes. The method selects at least two of the most energetic frequencies because these frequencies are least likely to be obscured in the presence of noise. In another example embodiment, the actual amplitudes of the frequencies are not as important as the amplitude ratio between the frequencies.

In 234, the method determines a respective amplitude associated with each of at least two frequencies. As noted above, in an example embodiment, the method selects the frequencies after performing the signal analysis and then determines the amplitudes associated with each of the selected frequencies.

In 235, the method identifies an amplitude ratio between each of the respective amplitudes. In an example embodiment, when the method identifies at least two of the frequencies and determines their respective amplitudes, the method identifies an amplitude ratio between the identified frequencies. In another example embodiment, the preferred ratio is close to "1".

Alternatively, in 236, the method identifies at least one period of silence within the audio stream. The period of silence may be identified when energy is lower than a percentage of a peak amplitude associated with a respective sample of the audio stream. For example, the period of silence may be defined as any period of the signal where the average amplitude is less than, for example, 10% of the peak amplitude for that given sample. In another example embodiment, the percentage is tunable.

FIG. 10 is a flowchart of an example embodiment for applying a silence constraint to match periods of silence in the stream audio print to periods of silence in a known audio print.

In 237, the method applies a silence constraint to match periods of silence in the stream audio print to periods of silence in a known audio print from a library of known audio prints. The silence constraint is associated with the known audio print. In an example embodiment, the method performs a signal analysis on the audio stream, and then applies a silence constraint to the stream audio print before computing the total scoring metric function. The signal analysis is performed on both sound and silence within the audio stream, and then the silence constraint is applied to portions of the stream audio print that are determined to be periods of silence as described, for example, above in 236.

In 238, the method temporally matches at least one silence period between the stream audio print and the known audio print. In an example embodiment, the method matches at least one silence period in the stream audio print to at least one silence period in the known audio print where the silence period in the stream audio print must occur at the same point as the silence period in the known audio print. If the silence period in the stream audio print is not determined to occur at the same point as in the known audio print, then the silence constraint is determined to have failed, and the total scoring metric function is not performed on the stream audio print.

FIG. 11 is a flowchart of an example embodiment for determining a potential match between the stream audio print and the known audio print.

In 239, the method determining a potential match between the stream audio print and the known audio print. In an example embodiment, the method performs signal analysis on an audio stream to compute a stream audio print. The method then applies a silence constraint to the stream audio print to determine if periods of silence in the stream audio print match periods of silence in the known audio print. If application of the silence constraint is successful, then the method determines there is a potential match between the stream audio print and the known audio print, and proceeds to compute the total scoring metric function.

In 240, the method determines the potential match between:
i) at least two frequencies and amplitude ratios associated with the stream audio print, and
ii) at least two frequencies and amplitude ratios associated with the known audio print.

In an example embodiment, the method performs signal analysis on the audio stream to compute the stream audio print. The stream audio print may be computed in a variety of ways. The stream audio print may be comprised of at least two frequencies, and an amplitude ratio of the respective amplitudes associated with the frequencies. The known audio print likewise may be comprised of at least two frequencies and an amplitude ratio of the respective amplitudes associated with the known audio print frequencies. The method may use a variety of ways to determine the potential match, for example, using the equations described in FIG. 4.

FIG. 12 is a flowchart of an example embodiment for receiving the audio stream of an outbound telephone call before the call is answered.

In 241, the method receives, at the processor, an audio stream from an application.

In 242, the method receives the audio stream of an outbound telephone call before the telephone call is answered. In this example, the application may desire to know if there is any information in this audio that can allow the application to more accurately disposition the result of attempted call. In an example embodiment, the audio stream is comprised of at least one of:
i) early media,
ii) pre-call audio of the telephone call, and
iii) ring back audio.

The known audio print from the library of known audio prints comprises a library of pre-recorded messages representing messages played by at least one of:
i) a telecommunication carrier,
ii) a phone company,
iii) a mobile phone company, and
iv) a ring back tone provider.

For example, the message might be played by the terminating telephone company and might comprise voice audio data saying, "The number you have reached has been disconnected". Or, the message might be played by a mobile phone company and might say, "The subscriber you are trying to reach is temporarily not available, please try your call again later". These example messages may be part of a library of known audio prints that the application wishes to detect.

The pre-recorded messages comprise at least one of:
i) voice audio,
ii) a period of silence,
iii) a special information tone, and
iv) a ring tone.

FIG. 12 is a flowchart of an example embodiment for receiving the audio stream of an outbound telephone call immediately after the call is answered.

In 243, the method receives, at the processor, an audio stream from an application.

In 244, the method receives the audio stream of an outbound telephone call immediately after the telephone call is answered. In this example, the application may wish to know if an answering machine or voicemail system has answered the call, in which case it may take different action than if the called party answers the phone. The known audio print from the library of known audio prints comprises a library of pre-recorded messages representing messages played by at least one of:
i) an answering machine, and
ii) a voicemail system.

The pre-recorded messages comprise at least one of:
i) a default message played by the answering machine if a person receiving the telephone call has not recorded their own greeting,
ii) the voicemail system used by a Private Branch Exchange (PBX) system,
ii) the voicemail system used by an Automatic Call Distributor (ACD) system,
iii) the voicemail system used by a mobile carrier,
iv) the voicemail system used by a telephone company,
v) another type of automated answering message played when the person receiving the telephone call does not answer in person, and
vi) a beep or tone played by the answering machine or the voicemail system indicating that a caller is to record a message.

For example, the message might be played by a commercial home answering machine if the homeowner has not recorded a custom greeting. The message may recite, "We can not take your call right now". In another example, the message may be from an automated voicemail system used by a mobile phone company if the called party (i.e., the person receiving the phone call) doesn't answer the phone. In this scenario, the message may recite, "The person you have called can not answer the phone, please leave a message". These example messages may be part of a library of known audio prints that the application wishes to detect.

In 245, the method receives, at the processor, an audio stream from an application.

In 246, the method receives the audio stream of an outbound telephone call after the telephone call is answered. In this example, the application may be placing a call to a remote Interactive Voice Response (IVR) system, and may wish to automatically navigate a set of menus to obtain some data. The known audio print from the library of known audio prints comprises a library of pre-recorded messages representing messages played by an interactive voice response (IVR) system. The pre-recorded messages comprise at least one of:
i) voice prompts played by the TVR; and
ii) tones played by the IRV.

For example, the pre-recorded messages might correspond to different voice prompts played by the IVR, e.g. "Hello, you have reached the First Bank of Example Town", and "To check your account balance, press 1", The application may, by a combination of using the method to detect menu prompts, and then by playing DTMF tones, navigate through the IVR menus. Further pre-recorded messages in the known audio print library could include simple pre-recorded numbers such as, "one", "two", "three", ... "ten", "hundred", and other short phrases such as "dollars", and "cents". With such pre-recorded messages in the known audio print library, the method may supply the application with details about which messages were matched so that the application could understand the account balance.

A method and system for matching a digitized stream of audio signals to a known audio recording have been disclosed.

Although embodiments disclosed herein have been described in accordance with the embodiments shown, one of ordinary skill in the art will readily recognize that there could be variations to the embodiments and those variations would be within the spirit and scope of embodiments disclosed herein. Accordingly, many modifications may be made by one of ordinary skill in the art without departing from the spirit and scope of the appended claims.

What is claimed is:

1. A method of matching a digitized stream of audio signals to a known audio recording, the method comprising:
receiving, at a processor, an audio stream from an application;
performing, at the processor, signal analysis on the audio stream to compute a stream audio print of the audio stream, wherein the audio stream is comprised of sound and silence, wherein the stream audio print is computed on sound and silence, wherein the stream audio print identifies a pattern associated with the audio stream, wherein the pattern is comprised of at least two of sound, silence and frequency, wherein the pattern matches a similar pattern of at least two of sound, silence and frequency in known audio print from a library of known audio prints, and wherein the signal analysis is performed on sound and silence within the audio stream;
applying, at the processor a silence constraint to match periods of silence in the stream audio print to periods of silence in the known audio print from the library of known audio prints, wherein the silence constraint is associated with the known audio print;
if application of the silence constraint is successful, computing, at the processor, a total scoring metric function associated with a potential match to identify a match between the stream audio print and the known audio print, wherein computing the total scoring metric function comprises:
overlaying the stream audio print with the known audio print;
computing a scoring metric function at a subset of temporal points, wherein computing the scoring metric function comprises:
computing the scoring metric function, at a temporal point, between component data from the stream audio print and component data from the known audio print, wherein the component data from the stream audio print comprises:
i) a first frequency associated with the stream audio print;
ii) a second frequency associated with the stream audio print; and
iii) a first amplitude ratio associated with the first frequency and the second frequency; and
wherein the component data from the known audio print comprises:
i) a third frequency associated with the known audio print;
ii) a fourth frequency associated with the known audio print; and
iii) a second amplitude ratio associated with the third frequency and the fourth frequency; and
summing a result of the scoring metric function at each of the subset of temporal points to create a total score metric, wherein the total score metric is a result of the total scoring metric function; and
determining, at the processor, the potential match between the stream audio print and the known audio print.

2. The method of claim 1 further comprising:
calculating a first component as a difference between the first frequency and the third frequency;
applying a first tunable parameter to scale the first component;
calculating a second component as a difference between the second frequency and the fourth frequency;
applying a second tunable parameter to scale the second component;

calculating a third component as a difference between the first amplitude ratio and the second amplitude ratio;

applying a third tunable parameter to scale the third component; and summing the first component, the second component, and the third component to calculate the scoring function, wherein each of the first, second and third tunable parameters is chosen to scale an influence that the respective first, second, and third component has on the result of the scoring metric function.

3. The method of claim 2 further comprising:

determining the match between the stream audio print and the known audio print when the total scoring metric is a low value, wherein the low value is less than a tunable threshold.

4. The method of claim 1 wherein computing the scoring metric function at the subset of temporal points comprises at least one of:

i) choosing the subset of temporal points as temporal points that are not periods of silence; and ii) choosing the subset of temporal points as temporal points that have a greatest frequency amplitude, wherein a number of temporal points in the subset is tunable.

5. The method of claim 1 further comprising:

performing the signal analysis, applying the silence constraint, determining the potential match, and computing the total scoring metric function, real time, on the audio stream as the audio stream is received.

6. The method of claim 1 further comprising:

generating an event as a result of identifying the match by notifying the application of identification of the match.

7. The method of claim 1 further comprising:

constructing, at the processor, the library of known audio prints from pre-recorded audio stream segments provided by the application, wherein the library of known audio prints comprises known audio prints and synthetic audio prints, and wherein the known audio print is created by:

determining periods of silence in the pre-recorded audio stream segments where energy is less than a tunable threshold, to create a silence constraint associated with the known audio print;

selecting temporal points within the known audio print; and determining component data at the temporal points; and generating a synthetic audio print from a plurality of similar audio streams from the pre-recorded audio stream segments provided by the application.

8. The method of claim 7 wherein generating the synthetic audio print comprises:

performing the signal analysis on a plurality of similar audio streams to generate a plurality of stream audio prints;

performing a statistical comparison on the plurality of stream audio prints to determine:

i) common periods of silence;

ii) common frequencies among the plurality of stream audio prints; and iii) frequencies within the plurality of stream audio prints that most often match at least one frequency associated with the at least one known audio print; and generating the synthetic audio print from:

i) the common periods of silence;

ii) the common frequencies among the plurality of stream audio prints; and iii) the frequencies within the plurality of stream audio prints that most often match the at least one frequency associated with the at least one known audio print.

9. The method of claim 8 further comprising:

using the synthetic audio print as the known audio print when:

i) determining the potential match; and ii) computing the total scoring metric function.

10. The method of claim 1 further comprising:

if application of the silence constraint is not successful, continuing to perform the signal analysis, apply the silence constraint, determine the potential match, and compute the total scoring metric function on a plurality of segments associated with the audio stream, wherein the audio stream is comprised of the plurality of segments, until at least one of:

i) the potential match is determined; and ii) the potential match is not determined in any of the plurality of segments, and notifying the application that there is no matching known audio print, for the known audio print, or any of the known audio prints in the library of known audio prints.

11. The method of claim 1 further comprising:

if application of the silence constraint is not successful, identifying the stream audio print as a possible new known audio print to be added to the library of known audio prints.

12. The method of claim 1 wherein performing the signal analysis on the audio stream comprises:

determining at least two frequencies within the audio stream wherein the at least two frequencies are selected from a plurality of computed frequencies;

determining a respective amplitude associated with each of the at least two frequencies; and identifying an amplitude ratio between each of the respective amplitudes.

13. The method of claim 1 wherein performing the signal analysis on the audio stream comprises:

identifying at least one period of silence within the audio stream wherein the at least one period of silence is identified when energy is lower than a percentage of a peak amplitude associated with a respective sample of the audio stream, wherein the percentage is tunable.

14. The method of claim 1 wherein applying the silence constraint to the potential match comprises:

temporally matching at least one silence period between the stream audio print and the known audio print.

15. The method of claim 1 wherein determining the potential match between the stream audio print and the known audio print from the library of known audio prints comprises:

determining the potential match between:

i) at least two frequencies and amplitude ratios associated with the stream audio print; and ii) at least two frequencies and amplitude ratios associated with the known audio print.

16. The method of claim 1 wherein receiving, at the processor, the audio stream from the application comprises:

receiving the audio stream of an outbound telephone call before the telephone call is answered, wherein the audio stream is comprised of at least one of:

i) early media;

ii) pre-call audio of the telephone call; and iii) ring back audio;

wherein the known audio print from the library of known audio prints comprises a library of pre-recorded messages representing messages played by at least one of:
  i) a telecommunication carrier;
  ii) a phone company;
  iii) a mobile phone company; and
  iv) a ring back tone provider;
and wherein the pre-recorded messages comprise at least one of:
  i) voice audio;
  ii) a period of silence;
  iii) a special information tone; and
  iv) a ring tone.

17. The method of claim 1 wherein receiving, at the processor, the audio stream from the application comprises:
  receiving the audio stream of an outbound telephone call immediately after the telephone call is answered;
  wherein the known audio print from the library of known audio prints comprises a library of pre-recorded messages representing messages played by at least one of:
    i) an answering machine; and
    ii) a voicemail system;
  and wherein the pre-recorded messages comprise at least one of:
    i) a default message played by the answering machine if a person receiving the telephone call has not recorded their own greeting;
    ii) the voicemail system used by a PBX system;
    iii) the voicemail system used by an Automatic Call Distributor (ACD) system;
    iv) the voicemail system used by a mobile carrier;
    v) the voicemail system used by a telephone company;
    vi) another type of automated answering message played when the person receiving the telephone call does not answer in person; and
    vii) a beep or tone played by the answering machine or the voicemail system indicating that a caller is to record a message.

18. The method of claim 1 wherein receiving, at the processor, the audio stream from the application comprises:
  receiving the audio stream of an outbound telephone call after the telephone call is answered;
  wherein the known audio print from the library of known audio prints comprises a library of pre-recorded messages representing messages played by an interactive voice response (IVR) system;
  and wherein the pre-recorded messages comprise at least one of:
    i) voice prompts played by the IVR; and
    ii) tones played by the IVR.

19. A computer program product for matching a digitized stream of audio signals to a known audio recording, the computer program product comprising:
  a non-transitory computer readable memory device having computer readable program code embodied therewith, the computer readable program code configured to:
  receive an audio stream from an application;
  perform signal analysis on the audio stream to compute a stream audio print of the audio stream, wherein the audio stream is comprised of sound and silence, wherein the stream audio print is computed on sound and silence, wherein the stream audio print identifies a pattern associated with the audio stream, wherein the pattern is comprised of at least two of sound, silence and frequency, wherein the pattern matches a similar pattern of at least two of sound, silence and frequency in known audio print from a library of known audio prints, and wherein the signal analysis is performed on sound and silence within the audio stream;
  apply a silence constraint to match periods of silence in the stream audio print to periods of silence in the known audio print from the library of known audio prints, wherein the silence constraint is associated with the known audio print;
  if application of the silence constraint is successful, compute, at the processor, a total scoring metric function associated with a potential match to identify a match between the stream audio print and the known audio print, wherein computing the total scoring metric function comprises:
    overlaying the stream audio print with the known audio print;
    computing a scoring metric function at a subset of temporal points, wherein computing the scoring metric function comprises:
      computing the scoring metric function, at a temporal point, between component data from the stream audio print and component data from the known audio print, wherein the component data from the stream audio print comprises:
        i) a first frequency associated with the stream audio print;
        ii) a second frequency associated with the stream audio print; and
        iii) a first amplitude ratio associated with the first frequency and the second frequency; and
      wherein the component data from the known audio print comprises:
        1. a third frequency associated with the known audio print;
        2. a fourth frequency associated with the known audio print; and
        3. a second amplitude ratio associated with the third frequency and the fourth frequency; and
    sum a result of the scoring metric function at each of the subset of temporal points to create a total score metric, wherein the total score metric is a result of the total scoring metric function; and,
  determine the potential match between the stream audio print and the known audio print.

20. A system comprising:
  a processor; and
  a non-transitory computer readable memory device, having computer readable program code embodied therewith, the computer readable program code configured to:
  receive an audio stream from an application;
  perform signal analysis on the audio stream to compute a stream audio print of the audio stream, wherein the audio stream is comprised of sound and silence, wherein the stream audio print is computed on sound and silence, wherein the stream audio print identifies a pattern associated with the audio stream, wherein the pattern is comprised of at least two of sound, silence and frequency, wherein the pattern matches a similar pattern of at least two of sound, silence and frequency in known audio print from a library of known audio prints, and wherein the signal analysis is performed on sound and silence within the audio stream;
  apply a silence constraint to match periods of silence in the stream audio print to periods of silence in the known audio print from the library of known audio prints, wherein the silence constraint is associated with the known audio print;

if application of the silence constraint is successful, compute, at the processor, a total scoring metric function associated with a potential match to identify a match between the stream audio print and the known audio print, wherein computing the total scoring metric function comprises:

overlaying the stream audio print with the known audio print;

computing a scoring metric function at a subset of temporal points, wherein computing the scoring metric function comprises:

computing the scoring metric function, at a temporal point, between component data from the stream audio print and component data from the known audio print, wherein the component data from the stream audio print comprises:

i) a first frequency associated with the stream audio print;

ii) a second frequency associated with the stream audio print; and iii) a first amplitude ratio associated with the first frequency and the second frequency; and wherein the component data from the known audio print comprises:

i) a third frequency associated with the known audio print;

ii) a fourth frequency associated with the known audio print; and iii) a second amplitude ratio associated with the third frequency and the fourth frequency; and sum a result of the scoring metric function at each of the subset of temporal points to create a total score metric, wherein the total score metric is a result of the total scoring metric function; and, determine the potential match between the stream audio print and the known audio print.

* * * * *